United States Patent
Oki et al.

(10) Patent No.: US 9,534,632 B2
(45) Date of Patent: Jan. 3, 2017

(54) BEARING STRUCTURE OF TURBO CHARGER

(71) Applicant: TOYOTA JIDOSHA KABUSHIKI KAISHA, Toyota-shi, Aichi-ken (JP)

(72) Inventors: Toshinori Oki, Toyota (JP); Koichi Yonezawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/617,208

(22) Filed: Feb. 9, 2015

(65) Prior Publication Data

US 2015/0240871 A1    Aug. 27, 2015

(30) Foreign Application Priority Data

Feb. 26, 2014  (JP) .................................. 2014-035020

(51) Int. Cl.
| | |
|---|---|
| *F16N 1/00* | (2006.01) |
| *F16C 33/10* | (2006.01) |
| *F16C 17/02* | (2006.01) |
| *F01D 25/16* | (2006.01) |

(Continued)

(52) U.S. Cl.
CPC .......... *F16C 33/106* (2013.01); *F01D 25/166* (2013.01); *F01D 25/186* (2013.01); *F16C 17/02* (2013.01); *F16C 27/045* (2013.01); *F05D 2220/40* (2013.01); *F05D 2240/53* (2013.01); *F05D 2240/54* (2013.01); *F05D 2260/602* (2013.01); *F16C 2360/24* (2013.01)

(58) Field of Classification Search
CPC ....... F16C 17/02; F16C 27/045; F16C 33/106; F16C 2360/24; F01D 25/166; F01D 25/186; F02C 7/06; F05D 2240/53; F05D 2240/54; F05D 2260/602
See application file for complete search history.

(56) References Cited

U.S. PATENT DOCUMENTS

| | | | |
|---|---|---|---|
| 3,043,636 A | 7/1962 | Macinnes et al. | |
| 6,017,184 A | 1/2000 | Aguilar et al. | |

(Continued)

FOREIGN PATENT DOCUMENTS

| | | |
|---|---|---|
| JP | H09-242554 A | 9/1997 |
| JP | 2001-512801 A | 8/2001 |

(Continued)

*Primary Examiner* — James Pilkington
(74) *Attorney, Agent, or Firm* — Oliff PLC

(57) ABSTRACT

A bearing structure of a turbo charger is provided. The turbo charger includes a semi-float bearing, a rotary shaft. The semi-float bearing is cylindrical and mounted in the bearing housing. The rotary shaft passes through the semi-float bearing and is supported rotatably by the semi-float bearing. The bearing structure includes a slinger wall and a projecting portion. The slinger wall is provided on the rotary shaft so that it is opposed to an end face in the axial direction of the semi-float bearing. The projecting portion projects from at least one of the slinger wall or the end face to the other. The projecting portion is provided in an annular shape along the circumferential direction of the semi-float bearing. The projecting portion includes a cutout portion that links the inner circumferential face side of the semi-float bearing with the outer circumferential face side thereof.

2 Claims, 5 Drawing Sheets

(51) Int. Cl.
*F01D 25/18* (2006.01)
*F16C 27/04* (2006.01)

(56) References Cited

U.S. PATENT DOCUMENTS

| | | | |
|---|---|---|---|
| 7,670,056 B2* | 3/2010 | Petitjean | F01D 25/16 |
| | | | 384/284 |
| 9,140,185 B2* | 9/2015 | Castan | F16C 27/02 |
| 2012/0263589 A1 | 10/2012 | Iwata et al. | |
| 2015/0176593 A1* | 6/2015 | Dayalan | F01D 25/186 |
| | | | 415/1 |

FOREIGN PATENT DOCUMENTS

| | | |
|---|---|---|
| JP | 2005-133635 A | 5/2005 |
| JP | 2012-219788 A | 11/2012 |
| JP | 2013-079591 A | 5/2013 |
| WO | 2013/173220 A1 | 11/2013 |

* cited by examiner

BEARING STRUCTURE OF TURBO CHARGER

INCORPORATION BY REFERENCE

The disclosure of Japanese Patent Application No. 2014-035020 filed on Feb. 26, 2014 including the specification, drawings and abstract is incorporated herein by reference in its entirety.

BACKGROUND OF THE INVENTION

1. Field of the Invention

The present invention relates to a bearing structure of a turbo charger.

2. Description of Related Art

As a bearing structure of a turbo charger, as indicated in Japanese Patent Application Publication No. 2005-133635 (JP 2005-133635 A), for example, a bearing structure in which a semi-float bearing is mounted in its bearing housing to support a rotary shaft of the turbo charger has been known. This semi-float bearing is formed cylindrically. The above-described rotary shaft passes through the semi-float bearing and has a slinger wall which is opposed to an end face in the axial direction of the semi-float bearing.

Oil is supplied to each of between the outer circumferential face of the semi-float bearing and the bearing housing and between the inner circumferential face of the semi-float bearing and the rotary shaft. Then, the supply of oil between the outer circumferential face of the semi-float bearing and the bearing housing results in formation of oil layer between the outer circumferential face of the semi-float bearing and the bearing housing so as to suppress vibration of the same bearing (rotary shaft). On the other hand, the oil supplied between the inner circumferential face of the semi-float bearing and the rotary shaft lubricates a gap between the inner circumferential face of the semi-float bearing and the rotary shaft and at the same time, cools the same portion.

In the above-mentioned bearing structure of the turbo charger, the oil supplied between the inner circumferential face of the semi-float bearing and the rotary shaft flows to the outer circumferential face side of the same semi-float bearing via a gap between the end face in the axial direction of the semi-float bearing and the slinger wall of the rotary shaft. If the oil flow increases, it becomes difficult to retain oil between the inner circumferential face of the semi-float bearing and the rotary shaft, thereby the cooling efficiency by the oil being reduced.

If the direction of the oil flow cannot be controlled when the oil supplied between the inner circumferential face of the semi-float bearing and the rotary shaft flows to the outer circumferential face side of the semi-float bearing via the gap between the above-mentioned end face and the aforementioned slinger wall, a following problem may occur. That is, the oil which flows out to the outer circumferential face of the semi-float bearing via the gap between the above-mentioned end face and the aforementioned slinger wall may flow to a wheel fixed to the end portion in the axial direction of the rotary shaft of the turbo charger so that there is a fear that it may leak out to the same wheel side.

SUMMARY OF THE INVENTION

In views of the above-described problem, the present invention provides a bearing structure of a turbo charger which is capable of suppressing reduction of cooling efficiency by oil supplied between the inner circumferential face of a semi-float bearing and a rotary shaft and which when the oil flows out to the outer circumferential face side of the semi-float bearing, is capable of restricting it from leaking out to the side of a wheel fixed to an end portion of the rotary shaft of the turbo charger.

Then, according to an aspect of the present invention, there is provided a bearing structure of a turbo charger. The turbo charger includes a bearing housing, a semi-float bearing and a rotary shaft. The semi-float bearing is cylindrical and mounted in the bearing housing. The rotary shaft passes through the semi-float bearing and is supported rotatably by the semi-float bearing. The bearing structure of the turbo charger includes a slinger wall, a projecting portion and a cutout portion. The slinger wall is provided on the rotary shaft and the slinger wall is opposed to an end face of the semi-float bearing in an axial direction of the semi-float bearing. The projecting portion projects from at least one of the slinger wall or the end face of the semi-float bearing to the other of the slinger wall or the end face of the semi-float bearing. The projecting portion is provided in an annular shape along a circumferential direction of the semi-float bearing. The projecting portion includes a cutout portion configured to link an inner circumferential face side of the semi-float bearing with an outer circumferential face side of the semi-float bearing.

Here, in the bearing structure of the turbo charger, the projecting portion may project from the end face of the semi-float bearing to the slinger wall. In the bearing structure of the turbo charger, the projecting portion may project from the slinger wall of the rotary shaft to the end face of the semi-float bearing. Further, in the bearing structure of the turbo charger, the projecting portion may project from the end face of the semi-float bearing to the slinger wall and the projecting portion may project from the slinger wall of the rotary shaft to the end face of the semi-float bearing.

According to the above-described bearing structure of the turbo charger, because the projecting portion which projects from one of the end face and the slinger wall to the other is formed in the annular shape along the circumferential direction of the semi-float bearing, increase of the oil flow is suppressed. The reason is that the above-described formation of the projecting portion reduces the oil flow area between the end face and the slinger wall. Thus, it is possible to restrict reduction of cooling efficiency by oil which is caused by a difficulty in retaining the oil between the inner circumferential face of the semi-float bearing and the rotary shaft due to an increase of the oil flow between the end face and the slinger wall.

Further, the cutout portion for linking the inner circumferential face side of the bearing with the outer circumferential face side thereof is formed in the projecting portion. The cutout portion in the projecting portion ensures a larger oil flow area between the end face and the slinger wall than other portions than the cutout portion. Thus, the oil supplied between the inner circumferential face of the semi-float bearing and the rotary shaft comes to flow easily to the outer circumferential face side of the bearing via the cutout portion easily.

Thus, through such position setting for the cutout portion along the circumferential direction of the semi-float bearing, the oil flow direction from the inner circumferential face side of the semi-float bearing to the outer circumferential face side thereof between the end face and the slinger wall can be controlled. Then, controlling the oil flow direction prevents the oil from flowing to the wheel fixed to an end portion in the axial direction of the rotary shaft of the turbo charger, thereby restricting the oil from leaking out to the wheel side.

Further, in the above-described bearing structure of the turbo charger, the above-described cutout portion may be provided at a bottom portion of the projecting portion. Here, the projecting portion may be provided at a bottommost portion. In this case, the oil flowing to the outer circumferential face side of the semi-float bearing via the cutout portion flows downward effectively due to its own weight and consequently, the same oil becomes incapable of flowing easily to the wheel fixed to the end portion in the axial direction of the rotary shaft of the turbo charger.

Still further, in the bearing structure of the turbo charger, the bearing housing may have a drain hole and the cutout portion may be provided at a position corresponding to the drain hole. In this case, the oil flowing to the outer circumferential face side of the semi-float bearing via the cutout portion is discharged to the drain hole in the bearing housing easily after flowing out onto the same outer circumferential face. Consequently, the same oil becomes incapable of flowing easily to the wheel fixed to the end portion in the axial direction of the rotary shaft of the turbo charger.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
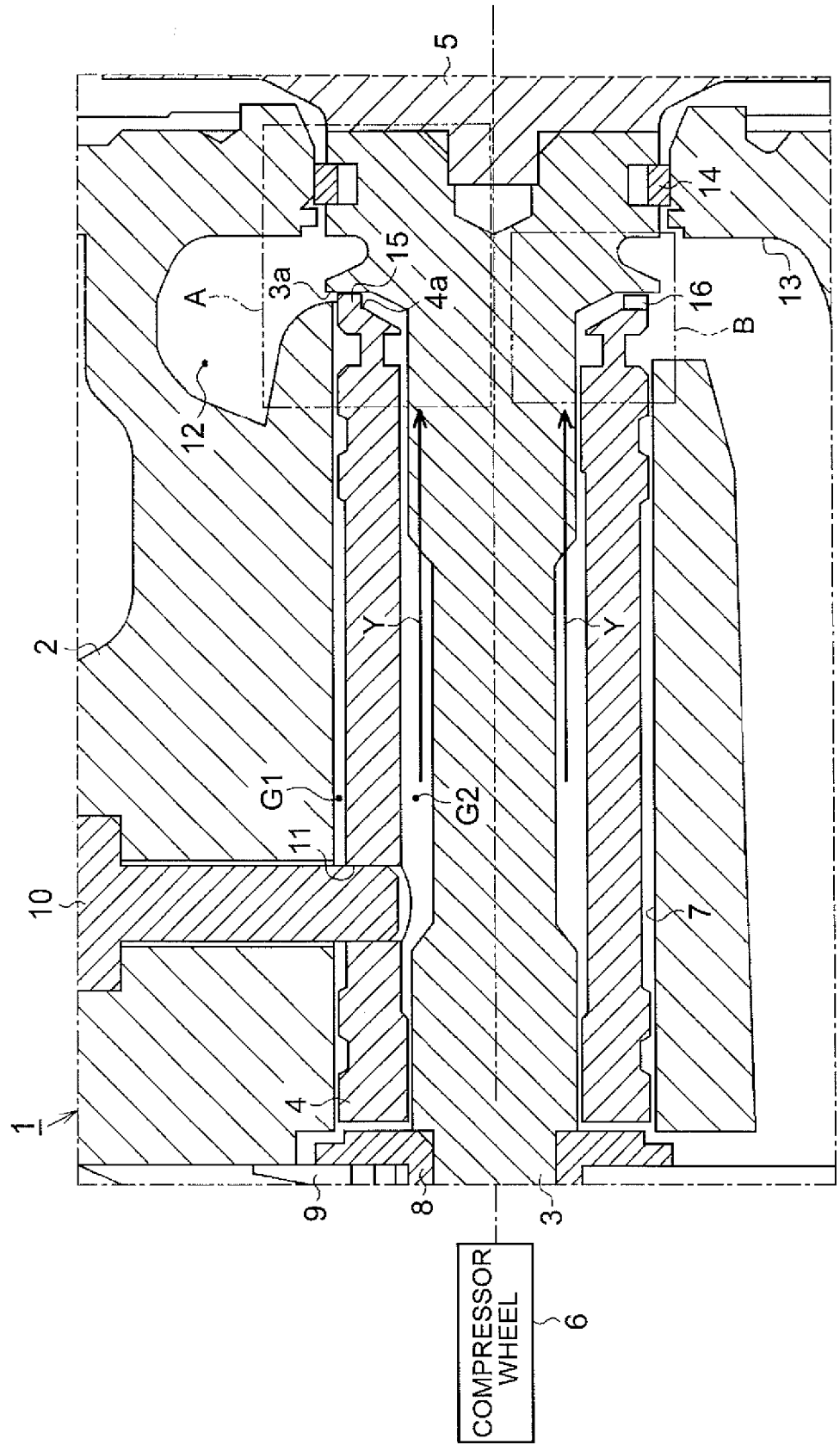
FIG. 1 is a sectional view showing a bearing structure of a turbo charger according to an embodiment of the present invention.

Hereinafter, an embodiment of the bearing structure of a turbo charger will be described with reference to FIGS. 1 to 4. As shown in FIG. 1, the turbo charger 1 includes a semi-float bearing 4, a rotary shaft 3, a turbine wheel 5 and a compressor wheel 6 which is fixed to another end portion of the aforementioned rotary shaft 3. The semi-float bearing 4 is cylindrical and mounted on a bearing housing 2. The rotary shaft 3 is supported rotatably by the semi-float bearing 4. The compressor wheel 6 is fixed to an end portion of the rotary shaft 3. In such a turbo charger 1, the turbine wheel 5 is rotated by kinetic energy of exhaust gas from an engine and the rotation is transmitted to the compressor wheel 6 via the rotary shaft 3 so that the same compressor wheel 6 rotates. Then, air is fed into a combustion chamber of the engine through a rotation of the compressor wheel 6.

In the turbo charger 1, the rotary shaft 3 passes through the cylindrical semi-float bearing 4. The semi-float bearing 4 is disposed within an accommodation hole 7 formed in the bearing housing 2. A collar 8 is fitted to a portion near the compressor wheel 6 of the outer circumferential face of the rotary shaft 3. A thrust bearing 9 which is fixed to the bearing housing 2 is mounted on the collar 8 such that it can rotate while it cannot move in the axial direction of the rotary shaft 3. The thrust bearing 9 supports the rotary shaft 3 rotatably while receiving a load in the axial direction of the rotary shaft 3 and regulates displacement of the rotary shaft 3 in the axial direction.

On the other hand, an engagement hole 11 is formed in the semi-float bearing 4. The engagement hole 11 is formed so that it can receive a regulating member 10 which projects to the axis of the rotary shaft 3 from the inner circumferential face of the accommodation hole 7 of the bearing housing 2 with a slight clearance. By inserting the regulating member 10 into the engagement hole 11, displacement of the rotation direction of the semi-float bearing 4 with respect to the bearing housing 2 about the rotary shaft 3 and displacement in the axial direction of the rotary shaft 3 are regulated. This semi-float bearing 4 functions as a radial bearing which receives a load in the radial direction of the rotary shaft 3 and supports the same rotary shaft 3 rotatably.

A gap G1 between the outer circumferential face of the semi-float bearing 4 and the inner circumferential face of the accommodation hole 7 in the bearing housing 2 is supplied with oil via an oil passage formed in the bearing housing 2. As a result, oil layer for suppressing vibration in the radial direction of the semi-float bearing 4 (rotary shaft 3) is formed in the gap G1. Further, the gap G1 communicates with a gap G2 between the inner circumferential face of the same bearing 4 and the outer circumferential face of the rotary shaft 3 via an oil hole formed in the semi-float bearing 4. Then, the gap G2 is supplied with oil from the gap G1 via the aforementioned oil hole and a gap between the inner circumferential face of the semi-float bearing 4 and the rotary shaft 3 is lubricated by the oil and the same portion is cooled.

The gap G1 is linked with a space portion 12 which is formed in the bearing housing 2 so as to surround a portion near the turbine wheel 5 of the outer circumferential face of the rotary shaft 3. Further, the bottommost portion of the space portion 12 is linked with a drain hole 13 which is formed in the same housing 2 to discharge the oil out of the bearing housing 2. Thus, oil flowing into the space portion 12 flows downward due to its own weight and is discharged out of the bearing housing 2 via the drain hole 13. A portion which is located between the rotary shaft 3 and the bearing housing 2 and which is nearer the turbine wheel 5 than the space portion 12 is provided with a seal portion 14 which prevents oil leakage to the turbine wheel 5 side.

On the other hand, oil supplied from the gap G1 to the gap G2 via the oil hole flows mainly in the direction to the turbine wheel 5 (direction of an arrow Y in the figure) along the axial direction of the rotary shaft 3. Further, the oil flows to the outer circumferential face side of the semi-float bearing 4 via a gap between an end face 4a on the turbine wheel 5 side of the semi-float bearing 4 and a slinger wall 3a formed on the rotary shaft 3 so as to be opposed to the aforementioned end face 4a. If such oil flow increases, it becomes difficult to retain oil in the gap G2 between the inner circumferential face of the semi-float bearing 4 and the rotary shaft 3, so that the cooling efficiency due to the oil drops.

Further, unless the flow direction of the oil supplied to the gap G2 between the inner circumferential face of the semi-float bearing 4 and the rotary shaft 3 can be controlled when it flows to the outer circumferential face side of the semi-float bearing 4 via the gap between the end face 4*a* and the slinger wall 3*a*, a following problem may occur. That is, there is a fear that the oil which flows out to the outer circumferential face of the semi-float bearing 4 via the gap between the end face 4*a* and the slinger wall 3*a* may flow to the turbine wheel 5. Although the oil flowing to the turbine wheel 5 is restricted from leaking to the turbine wheel 5 side by the seal portion 14, there is a possibility that the oil cannot be prevented completely from leaking to the turbine wheel 5 side. Thus, it is preferable to avoid the aforementioned oil flow to the turbine wheel 5 as long as possible.

To overcome these problems, the bearing structure of the turbo charger 1 of the present embodiment is provided with a projecting portion 15 for reducing an oil flow area between the end face 4*a* and the slinger wall 3*a*. Speaking in detail, the projecting portion 15 projecting to the slinger wall 3*a* is formed on the end face 4*a* in an annular shape along the circumferential direction of the semi-float bearing 4. Further, a cutout portion 16 is formed in the projecting portion 15 to link the inner circumferential face side of the semi-float bearing 4 with the outer circumferential face side thereof.

Figure 2:
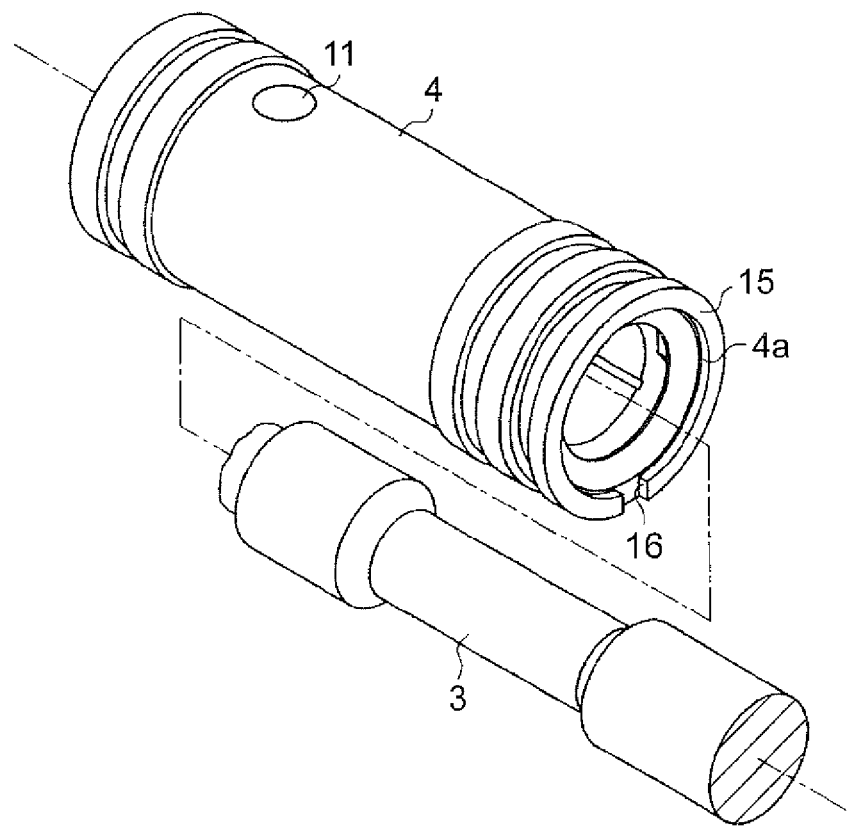
FIG. 2 is an exploded perspective view showing a semi-float bearing and a rotary shaft.
Figure 3:
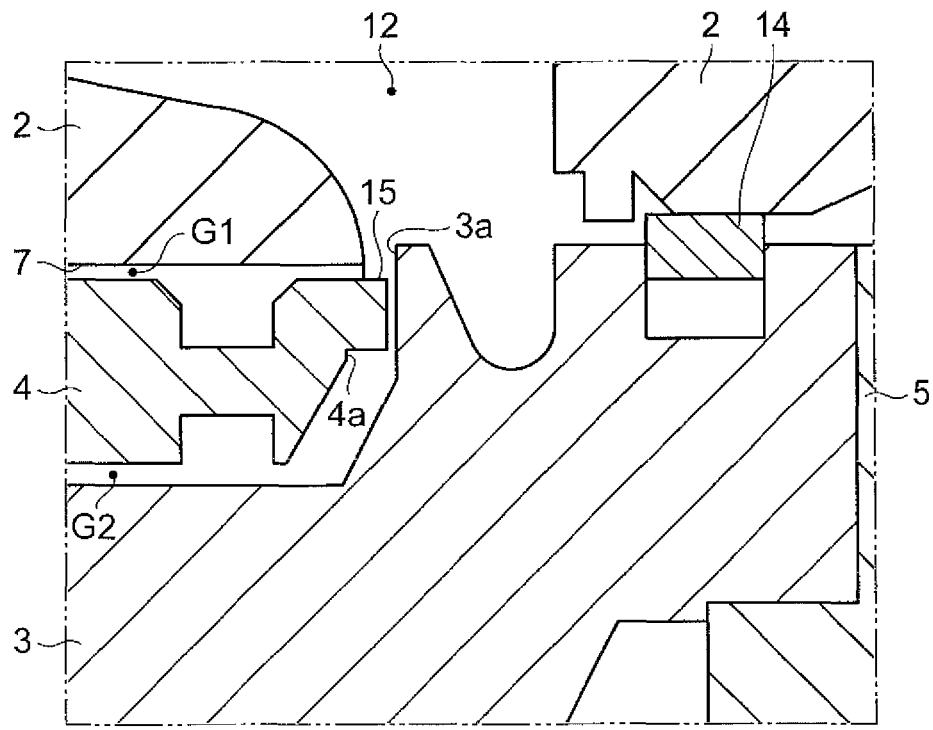
FIG. 3 is an enlarged view showing a portion A of the bearing structure of FIG. 1.

As shown in FIG. 2, the projecting portion 15 which extends in the annular shape along the circumferential direction of the semi-float bearing 4 is formed on the end face 4*a* of the semi-float bearing 4 so as to project in the axial direction of the rotary shaft 3. Further, the cutout portion 16 is formed at the bottom portion (bottommost portion in this case) of the projecting portion 15. Then, in a state in which the semi-float bearing 4 and the rotary shaft 3 are mounted in the bearing housing 2 as shown in FIG. 1, the cutout portion 16 formed at the bottommost portion of the projecting portion 15 is located corresponding to the drain hole 13 of the bearing housing 2. The reason is that the drain hole 13 is formed in the bottom portion of the bearing housing 2.

Next, an operation of the bearing structure of the turbo charger 1 of the present embodiment will be described. When oil flows from the gap G2 to the outer circumferential face side of the semi-float bearing 4 via the gap between the end face 4*a*, and the slinger wall 3*a* shown in FIG. 3, an increase of the oil flow is suppressed by the projecting portion 15. The reason is that the projecting portion 15 projects from the end face 4*a* to the slinger wall 3*a* and extends in the annular shape along the circumferential direction of the semi-float bearing 4 so that the flow area of oil between the end face 4*a* and the slinger wall 3*a* is reduced. Thus, the reduction of cooling efficiency by the oil which is caused by a difficulty in retaining oil in the gap G2 between the inner circumferential face of the semi-float bearing 4 and the rotary shaft 3 due to an increase of the oil flow in the gap between the end face 4*a* and the slinger wall 3*a* is suppressed.

Figure 4:
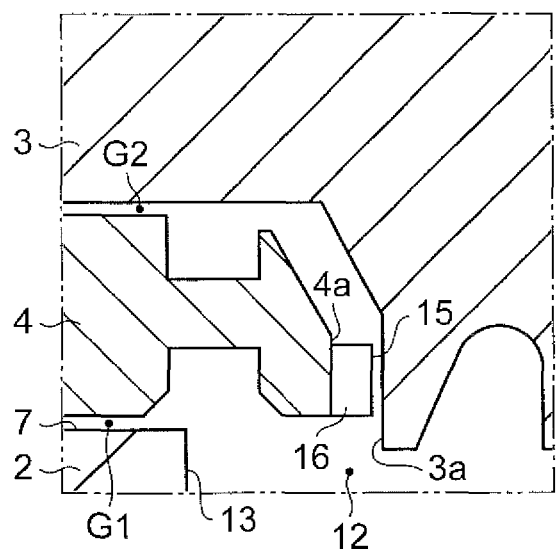
FIG. 4 is an enlarged view showing a portion B of the bearing structure of FIG. 1.

As shown in FIG. 4, the cutout portion 16 is formed at the bottom portion of the semi-float bearing 4 on the projecting portion 15 so as to link the inner circumferential face side of the same bearing 4 with the outer circumferential face side thereof. In the cutout portion 16 of the projecting portion 15, the flow area between the end face 4*a* and the slinger wall 3*a* is larger than other portion than the cutout portion 16.

Thus, oil within the gap G2 flows easily to the outer circumferential face side of the semi-float bearing 4 via the aforementioned cutout portion 16. Thus, the direction of the oil flow to the outer circumferential face side of the semi-float bearing 4 via the gap G2 between the end face 4*a* and the slinger wall 3*a* can be controlled by setting the position of the cutout portion 16 along the circumferential direction of the semi-float bearing 4.

In the present embodiment, the position of the cutout portion 16 is set such that the cutout portion 16 is formed at the bottommost portion of the projecting portion 15 and consequently, the direction of the oil flow is controlled to a different direction (downward) from a direction toward the turbine wheel 5 by the position setting. Thus, by controlling the flow direction of the oil in such a manner, the oil is prevented from flowing to the turbine wheel 5, thereby restricting the oil from leaking to the turbine wheel 5 side beyond the seal portion 14.

According to the embodiment described above in detail, a following effects can be obtained. (1) Reduction of cooling efficiency by oil supplied to the gap G2 between the inner circumferential face of the semi-float bearing 4 and the rotary shaft 3 can be suppressed and at the same time, when the oil flows out to the outer circumferential face side of the semi-float bearing 4, the oil can be restricted from leaking out to the side of the turbine wheel 5 fixed to an end portion of the rotary shaft 3.

(2) Because the aforementioned cutout portion 16 is formed at the bottommost portion of the projecting portion 15, oil flowing to the outer circumferential face side of the semi-float bearing 4 via the cutout portion 16 flows downward effectively due to its own weight and consequently, the oil becomes unlikely to flow to the turbine wheel 5.

(3) Further, because the cutout portion 16 is located corresponding to the drain hole 13 of the bearing housing 2, the oil which has flown out to the outer circumferential face of the semi-float bearing 4 from the gap G2 via the cutout portion 16 is discharged easily through the drain hole 13. Consequently, the oil becomes further unlikely to flow to the turbine wheel 5.

Figure 5:
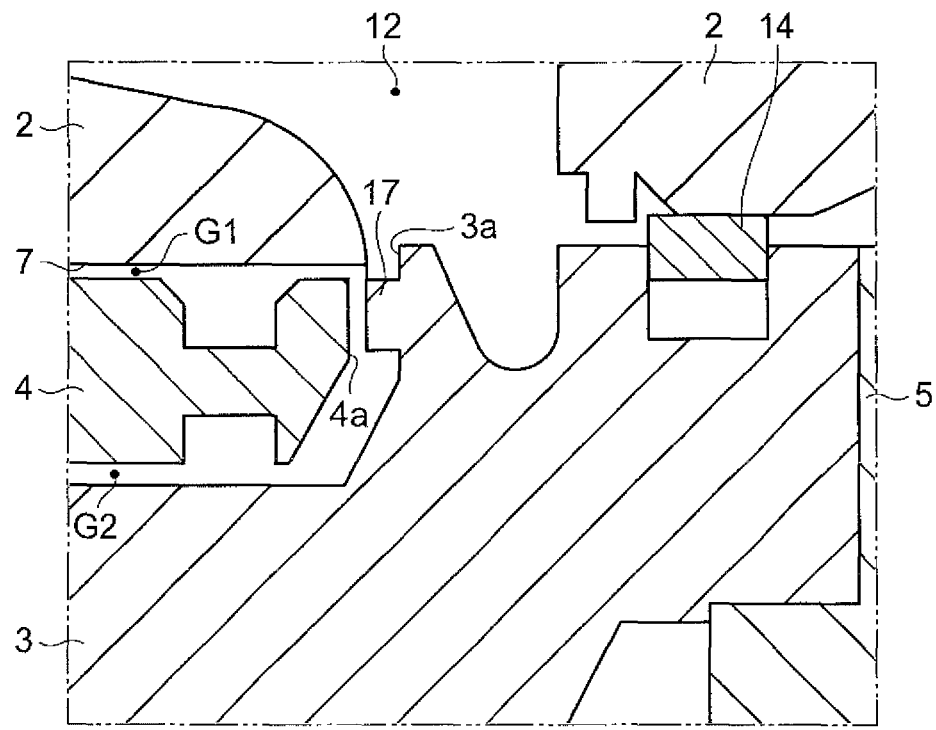
FIG. 5 is an enlarged view showing a portion equivalent to the portion A of the bearing structure of FIG. 1 in a first modification of the above-described embodiment.
Figure 6:
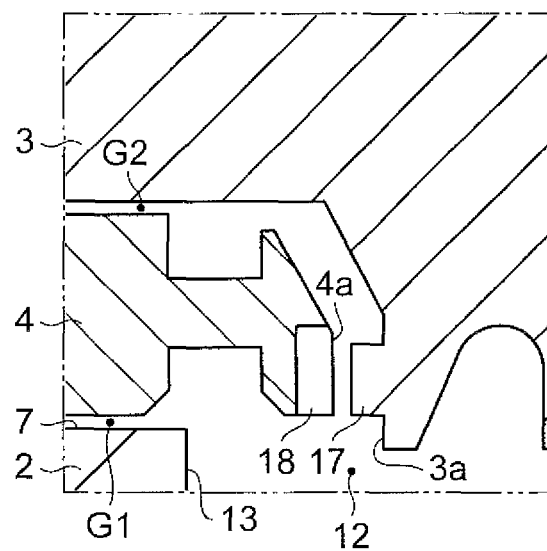
FIG. 6 is an enlarged view showing a portion equivalent to the portion B of the bearing structure of FIG. 1 in the first modification of the above-described embodiment.
Figure 7:
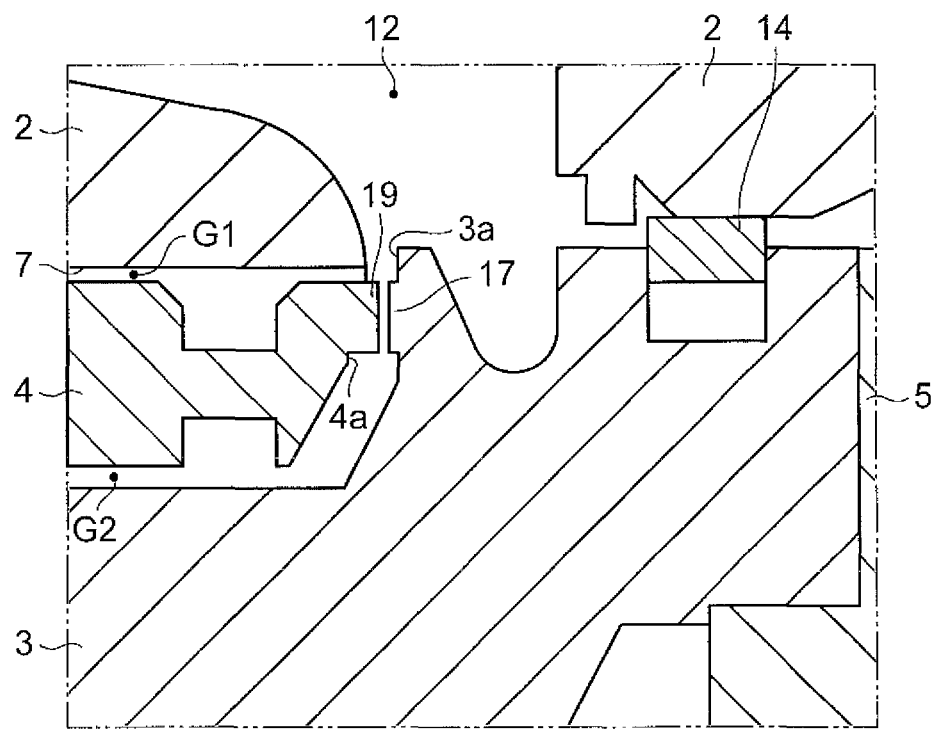
FIG. 7 is an enlarged view showing a portion equivalent to the portion A of the bearing structure of FIG. 1 in a second modification of the above-described embodiment.
Figure 8:
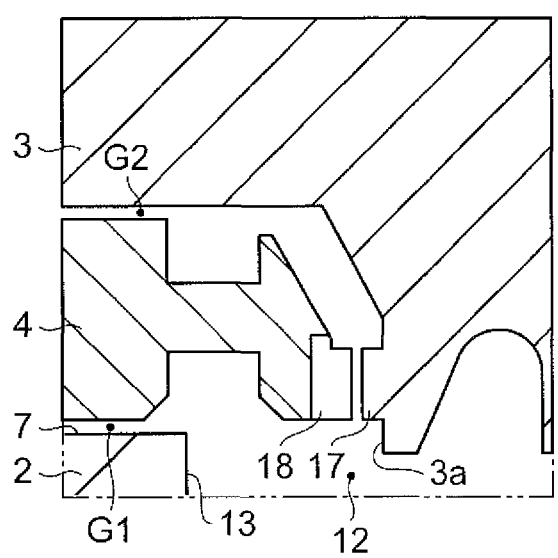
FIG. 8 is an enlarged view showing a portion equivalent to the portion B of the bearing structure of FIG. 1 in the second modification of the above-described embodiment.

In the meantime, the above-described embodiment can be modified as follows, for example. As a first modification of the present embodiment, as shown in FIGS. 5 and 6, a projecting portion 17 for reducing the oil flow area between the end face 4*a* and the slinger wall 3*a* may be formed so as to project from the slinger wall 3*a* to the end face 4*a*. In this case also, the cutout portion 18 is provided at the bottom portion of the end face 4*a* of the semi-float bearing 4 like the above-described embodiment. Further, as a second modification of the present embodiment, as show in FIGS. 7, 8, both the projecting portion 17 projecting from the slinger wall 3*a* to the end face 4*a* and a projecting portion 19 projecting from the end 4*a* to the slinger wall 3*a* may be formed to reduce the oil flow area between the end face 4*a* and the slinger wall 3*a*. In this case also, the cutout portion 18 is provided at the bottom portion of the end face 4*a* of the semi-float bearing 4 like the above-described embodiment.

The cutout portion 16 does not always have to be formed at the bottommost portion of the projecting portion 15. For example, the cutout portion 16 may be formed at other position than the bottommost portion of a bottom portion of the projecting portion 15.

Relative positions of the cutout portion 16 and the drain hole 13 in the circumferential direction of the semi-float bearing 4 do not always have to agree with each other. The drain hole 13 does not always have to be formed at the bottommost portion of the bearing housing 2.

For example, the drain hole 13 may be formed at other position than the bottommost portion of the bottom portion of the bearing housing 2. In this case, if the position of the cutout portion 16 is set to the same position as the above-described embodiment, the effect (2) above is obtained, and if it is set to a position corresponding to the position of the drain hole 13 after the above-described position change, the effect (3) above is obtained.

In the meantime, if with the cutout portion 16 formed at the bottommost portion of the projecting portion 15 as the above-described embodiment mentions, the cutout portion 16 is located corresponding to the drain hole 13, a remarkable effect can be obtained in that oil flowing out to the outer circumferential face of the semi-float bearing 4 via the gap G2 becomes incapable of flowing to the turbine wheel 5 side easily.

The present invention may be applied to a turbo charger in which the thrust bearing 9 is provided on the turbine wheel 5 side and oil supplied into the gap G2 flows mainly in the direction toward the compressor wheel 6 along the rotary shaft 3. In this case, the slinger wall which is opposed to the end face on the opposite side to the end face 4a of the semi-float bearing 4 is formed on the rotary shaft 3, and the annular shaped projecting portion for reducing the oil flow area between such opposing end face and slinger wall is formed while the cutout portion is formed in the projecting portion.

What is claimed is:

1. A bearing structure for a turbo charger, the turbo charger including:
    a semi-float bearing that is cylindrical and mounted in a bearing housing; and
    a rotary shaft that passes through the semi-float bearing, the rotary shaft being supported rotatably by the semi-float bearing, the bearing structure comprising:
    a slinger wall that is provided on the rotary shaft, the slinger wall opposing an end face of the semi-float bearing in an axial direction of the semi-float bearing; and
    at least one projecting portion that projects from at least one of the slinger wall or the end face of the semi-float bearing to the other of the slinger wall or the end face of the semi-floating bearing, the at least one projecting portion being provided in an annular shape along a circumferential direction of the semi-float bearing, and the at least one projecting portion including a cutout portion configured to link an inner circumferential face side of the semi-float bearing with an outer circumferential face side of the semi-float bearing, wherein
    the at least one projecting portion comprises a first projecting portion and a second projecting portion,
    the first projecting portion projects from the end face of the semi-float bearing to the slinger wall, and the second projecting portion projects from the slinger wall of the rotary shaft to the end face of the semi-float bearing,
    the cutout portion is provided at a bottom portion of the first projecting portion,
    the bearing housing has a drain hole, and
    the cutout portion is only provided at a position corresponding to the drain hole.

2. The bearing structure according to claim 1, wherein the cutout portion is provided at a bottommost portion of the first projecting portion.

* * * * *